Jan. 16, 1968  S. JONES  3,364,356
OPTICAL GUIDANCE APPARATUS FOR GUIDING A
MOVABLE OBJECT ALONG A STRAIGHT PATH
Filed May 1, 1964  3 Sheets-Sheet 2
Fig.3.
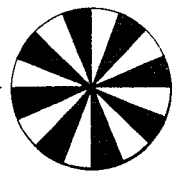
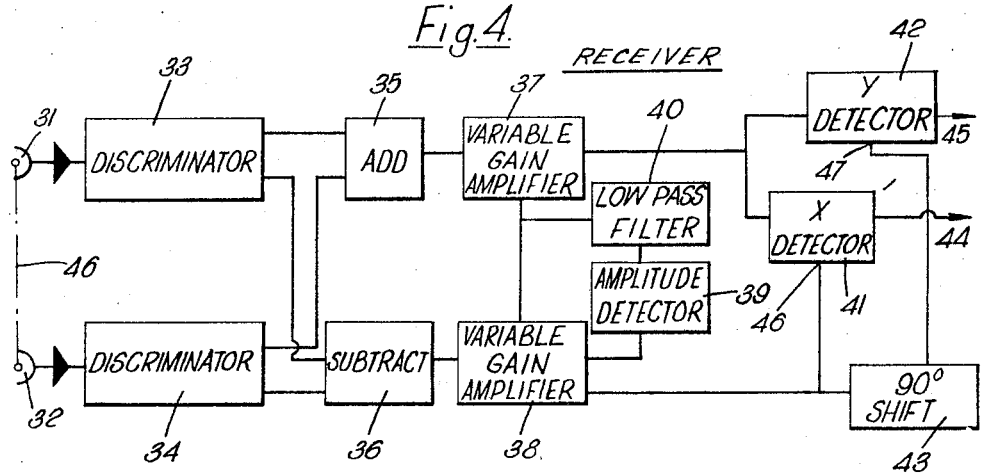
Fig.5.
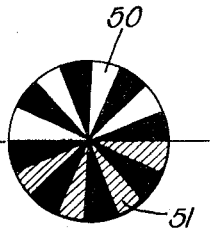

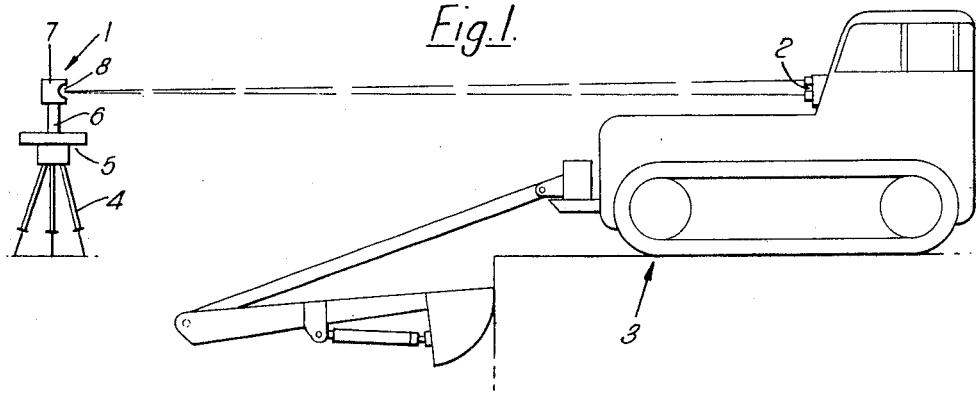
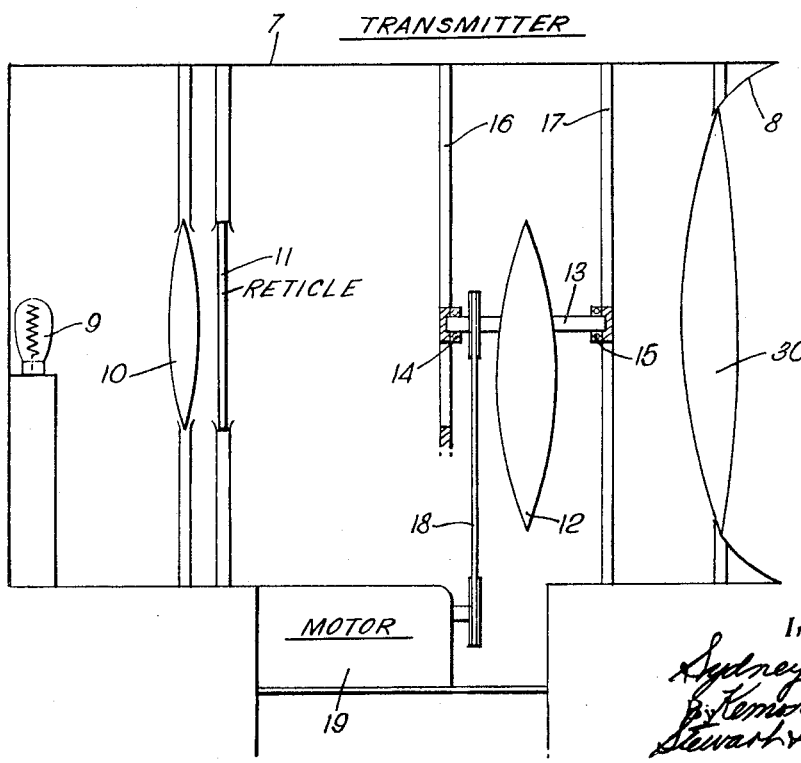

United States Patent Office 3,364,356
Patented Jan. 16, 1968

3,364,356
OPTICAL GUIDANCE APPARATUS FOR GUIDING A MOVABLE OBJECT ALONG A STRAIGHT PATH
Sydney Jones, Brentford, England, assignor to R. B. Pullin & Company Limited, Brentford, England, a British company
Filed May 1, 1964, Ser. No. 364,082
8 Claims. (Cl. 250—203)

ABSTRACT OF THE DISCLOSURE

This abstract is neither intended to define the invention of the application which, of course, is to be measured by the claims, nor it is intended to be limiting as to the scope of the invention in any way.

An apparatus for guiding a movable object such as a drain digging machine or a guided missile along a straight line path is disclosed in the hereinafter specification. The apparatus includes a transmitter which emits a beam of visible or infra-red radiation to thereby define the path to be traversed by the movable object; the object carries a receiver having a detector that is responsive to the radiation and which initiates action for maintaining the object on the path defined by the beam. The beam is modulated in the transmitter in such a way that a frequency modulated signal is sensed by the detector. This signal is subsequently demodulated and serves to operate the object's steering mechanism to steer the vehicle in both the horizontal and vertical directions so as to follow the path.

---

This invention relates to guidance apparatus, that is apparatus capable of producing a signal or signals indicative of the deviation of a moving object from a given straight path. This is of value in obtaining accurate guidance and control of machinery such as road surfacing vehicles or the digging mechanism of a drain laying machine. It is also applicable to the guidance of beam-riding missiles.

According to the invention such apparatus comprises a transmitter and a receiver, one for mounting in a fixed position and the other for fitting to movable apparatus, the transmitter including a source of visible or infra-red radiation for uniformly illuminating a first member in the form of a reticle divided into alternate bands of different opacity, each band varying in thickness along its length, a second member taking the form of an optical member placed on the side of the reticle opposite to the source, and means for causing effective rotation of the axis of one of the members around a path over the surface of the other member, and the receiver including a radiation detector responsive to the radiation from the transmitter, and an electrical circuit for analysing variations in the radiation reaching the detector, and for producing control signals by use of which the movable apparatus may be guided along a straight line toward the fixed position.

Considering the apparatus from the radiation aspect, and applying the principle of reversibility, it can be considered that as the effective rotation occurs the image of the detector is carried over the reticle along a circular path. The output from the detector to the elecrical circuit will thus be modulated according to the relative width and opacities of the bands in the circular path. If there is relative movement between the receiver and the transmitter the circular path scanned by the detector will move over the reticle, and since the bands have different thicknesses along their length the signal leaving the detector will be modulated differently to the previous one. The different modulations on this signal, either in frequency or amplitude or both, can be analysed by the electrical circuit which will then produce a signal denoting the deviation of the detector from a reference position along the line between the movable apparatus and the fixed position.

The optical member is preferably a lens, but a wedge or mirror arrangement can also be used.

The effective relative rotation of the axes of the two members can be either an actual rotation or a virtual rotation. If this is an actual rotation preferably the means for causing this comprises a motor connected to rotate the optical member about an axis collinear with the axes of the condenser and the reticle, but parallel to the optical axis of the optical member, whereby during such rotation the optical axis of the optical member describes a circular path over the surface of the reticle. An alternative method of obtaining this actual rotation is to nutate the reticle. If virtual rotation is used preferably the means for causing this comprises a pair of parallel reflecting surfaces positioned between the reticle and the optical member, the axes of which are collinear, one reflecting surface facing the optical member and having its mid-point on the axial line, and the other reflecting surface facing the reticle and having its mid-point offset from the axial line, and means for rotating the mirror system about the axial line whereby the reflection of the optical axis of the optical member is caused to describe a circular path over the surface of the reticle. An alternative method of obtaining this effect is to place a negative lens between the reticle and the optical member and to rotate the negative lens about the optical axis of the positive lens, the negative lens having its optical axis eccentric to this axis of rotation.

Most conveniently the radiation used is visible light and each radiation detector is a photoelectric cell. Alternatively however infra-red radiation can be used and then it is preferable to employ fused quartz lenses and other optical elements. Use of infra-red radiation leads to some increase in the range of the apparatus.

Examples of guidance systems according to the invention will now be described in more detail with reference to the accompanying drawings in which:

FIGURE 1 is a schematic view showing the deployment of the apparatus;

FIGURE 2 is a schematic view of one form of transmitter;

FIGURE 3 is an elevation of one form of reticle;

FIGURE 4 is a block circuit diagram of one form of receiver;

FIGURE 5 is an elevation of an alternative reticle;

Figure 6:
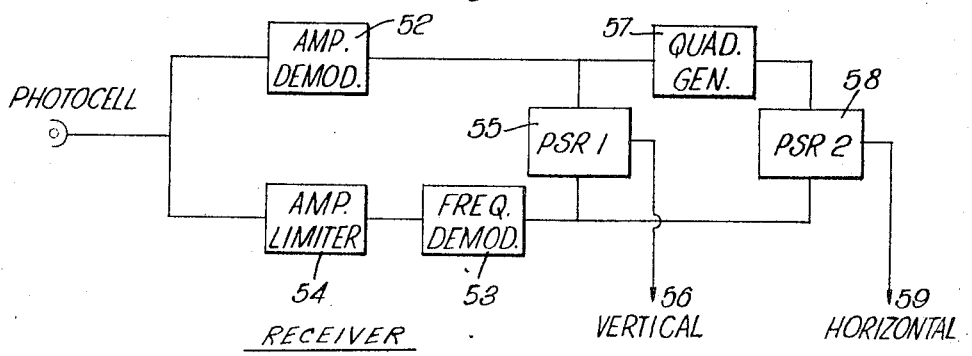
FIGURE 6 is a block circuit diagram showing a second type of receiver.

FIGURE 1 shows the preferred use of the apparatus, where the transmitter shown generally as 1 is placed in a fixed position and the detector 2 is mounted on the movable apparatus such as a drain digging machine shown generally as 3. The transmitter is mounted on a tripod 4 and the necessary circuits and levelling controls are included in a part 5 fixed directly to the tripod. A mast 6 projects upwardly from the part 5 and carries at its top a box 7, open at one side 8, which contains the optical system of the transmitter. Designing the transmitter in this way means that the centre of gravity is positioned in as low a position as possible, and also minimises the area of the highest parts so that the effect of wind will not be too great. Both these features add to the stability of the instrument.

The transmitter is provided with controls for both azimuth and elevation and may also include a telescope to facilitate sighting.

FIGURE 2 shows schematically the arrangement of the optical system within the box 7. This includes a filament lamp 9, under-run to increase its life and reduce power consumption, positioned in the focal plane of a condenser 10. Parallel light will thus leave the condenser 10 and fall on a reticle 11 so causing this to be uniformly illuminated. The reticle is photo-etched from thin stainless steel plate and comprises a series of alternate light and dark bands such as shown in FIGURES 3 and 5. Both these figures show sixteen segment reticles, although of course the number can be varied as required.

The reticle is positioned at the focal plane of a lens 12, which is mounted on a shaft 13 arranged to rotate in bearings 14 and 15 housed in supports 16 and 17 from the walls of the box 7. The axis about which the lens rotates is collinear with the optical axis of the condenser 10 and the centre of the reticle 11, but the optical axis of the lens 12 is eccentric from this. The shaft is driven by a belt drive 18 from an electric motor 19. Other drive systems are equally possible. The light leaving the lens 12 passes through a further lens 30, and the arrangement is such that the beam leaving the lens 30 has a very small angle of divergence.

From FIGURE 1 it will be seen that this beam falls on the detector 2, mounted in this example on the ditch digger. When the reticle shown in FIGURE 3 is used the receiver takes the form shown in FIGURE 4. In this example the receiver comprises two photoelectric cells 31 and 32, the receiving surfaces of which are coplanar and are separated by a short distance as shown in the figures. Each of the photoelectric cells is connected to a discriminator 33 and 34 respectively, and the output signals from the discriminator are fed both to an addition circuit 35 and to a subtraction circuit 36. The added signals are fed into a variable gain amplifier 37, and the subtracted signals into a matching amplifier 38. The amplifier 38 has a feedback loop through an amplitude detector 39 and a low pass filter 40, and the feedback signal is applied to both amplifier 37 and amplifier 38. The outputs from the two amplifiers are fed to an $x$ coordinate detector 41, and the output from the amplifier 37 is fed to a $y$ coordinate detector 42 together with the output signal from the amplifier 38 after this has undergone a 90° phase shift by passing through a phase shift circuit 43. The output signals 44 and 45 from the $x$ and $y$ coordinate detectors respectively can be fed either to instruments indicating the deviation of the movable apparatus from a straight line path towards the transmitter, or to valves controlling hydraulic circuits for automatically changing the path of the apparatus so that it maintains the required track.

In operation the lens 12 is rotated by the motor, and as already explained the effect of this rotation is to cause the light received by the photocells 31 and 32 to be modulated in frequency and amplitude as though the photocells themselves were moving in circular paths over the surface of the reticle 11. When the mid-point 46 of a line joining the two photocells lies on a projection of the optical axis of the lens 10 and the centre of the reticle 11 then the signal received at each of the two photocells 31 and 32 is modulated identically in both frequency and amplitude, but the two signals have a phase difference of 180°. This can conveniently be interpreted, using the principle of reversibility of light, as the condition where the images of both the photocells travel round a common circle on the surface of the reticle, the circle having its centre at the centre of the reticle. When, however the mid-point 46 moves off this line the effect will be to cause the images of the photocells to travel over two separate circles, neither of which has its centre at the reticle centre. The signals received at the two photocells will thus have a different frequency modulation. It can be shown that the instantaneous frequency $f$ of the photocell output may be expressed as $$f = f_m \left\{ 1 - \frac{r}{R} \cos(\theta - \alpha) \right\}$$

where $f_m$ is the mean chopping frequency, $r$ and $\alpha$ are the polar coordinates of the photocell position and R is the radius of the circle which the photocell can be considered as tracing out over the reticle surface.

The output voltage of a discriminator to which this photocell output is applied is then $$\overline{V} = -V \frac{r}{R} \cos(\theta - \alpha)$$

If a line parallel to that joining the photocells and passing through the projection of the optical axis 10 is considered as the $x$-axis this equation can be put into vector form using $x$ and $y$ as Cartesian coordinates of the photocell position; the equation then becomes $$\overline{V} = -\frac{V}{R}(x+jy)e^{-j\theta}$$

In the case being considered, if the Cartesian coordinates of the photocell 31 are $(x_1, y_1)$, those of the photocell 32 are $(x_2, y_1)$ and those of the mid-point 46 are $(x, y_1)$ then the output from the discriminator 33 will be $$\overline{V}_1 = -\frac{V}{R}(x_1+jy_1)e^{-j\theta}$$

and that from the discriminator 34 will be $$\overline{V}_2 = -\frac{V}{R}(x_2+jy_1)e^{-j\theta}$$

It can readily be shown that the sum of these two outputs is equal to $$\frac{2V}{R}(x+jy_1)e^{-j\theta}$$

and that the difference is $$= \frac{VD}{R}e^{-j\theta}$$

where D is the distance between the photocells, and thus equals $x_2-x_1$. This immediately provides a reference signal of the form $$-\frac{VD}{R} \cos \theta$$

which is applied to the $x$ coordinate detector 41 at 46, and after undergoing a 90° phase shift provides a reference signal of the form $$-\frac{VD}{R} \sin \theta$$

which is applied to the $y$ coordinate detector 42 at 47. Applied to each of these detectors is the sum of the discriminator outputs which it will be remembered is $$\frac{2V}{R}(x+jy)e^{-j\theta}$$

so it will be seen that if this signal is multiplied by $$-\frac{VD}{R} \cos \theta$$

in the $x$ detector the output from this detector will be equal to $$\frac{V^2D}{R^2} \cdot x$$

and then multiplied by $$-\frac{VD}{R} \sin \theta$$

in the $y$ detector the output from this detector will be $$\frac{V^2D}{R^2} \cdot y$$

It is seen that the detector outputs are each proportional both to the amplitude of the voltage leaving the photocell and to the respective coordinate, so that if a signal directly proportional to the coordinate is required voltage changes must be compensated for. In the circuit shown the feedback loop comprising the amputitude detector 39 and the low pass filter 40 perform this function by causing both the amplifiers 37 and 38 to act as automatic gain control amplifiers. By means of this feed-back loop the amplitude of signals fed to the coordinate detectors is made substantially independent of range for a given deviation from the null position, a great advantage when the signals form part of a servo system controlling automatically the path of the vehicle.

A somewhat simpler receiver system is shown in FIGURE 6; this only employs a single photocell and is intended for use with a reticle of the type shown in FIGURE 5. This reticle is divided into equal translucent and opaque segments in a way similar to that of FIGURE 3. Only half of the translucent segments, such as that shown at 50, are completely light transmitting and the other half, such as 51, only transmit a proportion of the light falling upon them, the usual proportion being in the range of 40% to 60%. The reticle shown in FIGURE 4 is photo-etched in a way similar to that shown in FIGURE 3, and after this has been done one half of the reticle is covered by a neutral filter. It will be seen that the signal from the photocell will be modulated both in frequency and amplitude, the frequency modulation being dependent on the particular circular path over the disc which the photocell can be considered as travelling, and the amplitude modulation changing each time the image of the cell crosses the diameter of the disc separating the translucent bands of different transmissions. This modulated signal is fed to an amplitude demodulator 52 and also to a frequency demodulator 53 after passage through an amplitude limiter 54. The two demodulators are arranged in parallel. The output from the frequency demodulator is fed to a first phase sensitive rectifier 54 which is switched by an output signal from the amplitude demodulator and acts to give an output signal 55 indicative of the vertical deviation of the photocell from the projection of the centre of the reticle. A further output from the amplitude demodulator passes to a quadrature generator 56 and from there to a second phase sensitive rectifier 57 which is switched by a further output from the frequency demodulator and acts to give a signal 58 indicative of the horizontal deviation of the photocell from the projected line. These output signals 56 and 59 can either be used to feed indicators to show deviations from the required path to an operator, or to operate valves controlling hydraulic circuits in the same way as the signals obtained from the circuit shown in FIGURE 4.

This system differs from the two-cell one in that the axes from which deviation is defined are determined by the transmitter. In the two cell system the cells themselves determine the direction of the axes, a feature which gives some advantages to the two-cell system.

Figure 7:
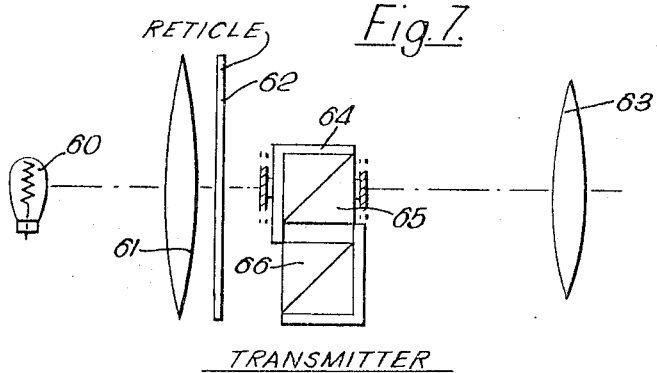
FIGURE 7 illustrates a possible modification to the transmitter.

FIGURE 7 shows an alternative way of obtaining effective rotation of the optical axis of the lens over the reticle, the rotation in this case being virtual rather than actual. This system comprises a filament lamp 60 placed in the focal plane of a condenser 61 so that a reticle 62 is substantially uniformly illuminated. Positioned between the reticle 62 and a lens 63 which is the equivalent of the lens 12 in FIGURE 2 is a framework 64 arranged for rotation about the optical axis of the lens system. The framework includes two prisms 65 and 66, the reflecting faces of which are parallel, the prism with its centre on the optical axis facing the lens 63, and the prism with its centre offset from this axis facing the reticle 62. It will readily be seen that as the prism assembly is rotated the image of the optical axis of the lens 63 is carried in a circular path over the reticle 62.

The assembly of FIGURE 2 has been shown with a single lens 30 positioned beyond the lens 12, and that shown in FIGURE 7 has no further lens beyond the lens 63. Either system may however be provided with further lenses designed to narrow the angle of divergence of the beam and thus to increase the range of the apparatus.

The reticle has been shown in the specific examples as divided into a number of segments of a disc, but it is to be understood that any pattern of alternating light and dark bands will be effective as long as it gives different frequency modulations to the light reaching the photocell for all positions of deviation of the photocell. One other specific pattern that is particularly useful is that of a spiral, preferably an Archmedean spiral. A reticle of this form will give greater angular sensitivity and thus greater range, but it does introduce manufacturing difficulties which are not met in the segmented reticle illustrated.

Although photo-etching has been given as the preferred method of manufacturing the reticle there are many other well-known possible methods of manufacture.

I claim:

1. Guidance apparatus for guiding a body along a straight path, comprising a transmitter for mounting in a fixed position and a receiver for fixing to said body,
   said transmitter comprising a source of radiation in the wavelength range including visible and infra-red radiation, a reticle having an axis and divided into adjacent bands of different opacity, each of the said bands varying in width along its length, said reticle being so located in relation to said source as to receive uniform illumination therefrom, an optical member having an axis and located at a greater distance from said source than said reticle and positioned so as to collect radiation passing through said reticle from said source, said optical member being operative to emit said collected radiation in the form of a beam issuing from said transmitter to define said straight path, and motor means for causing effective rotation of one of said axes around the other of said axes to thereby modulate said beam;
   said receiver including a radiation detector responsive to frequency variations in said beam, and an electrical circuit operative to analyse variations in the frequency of radiation sensed by said radiation detector to provide control signals for guiding said body along said straight path.

2. Guidance apparatus according to claim 1 wherein said optical member is a lens.

3. Guidance apparatus according to claim 1 wherein said transmitter includes a condenser located between said source and said reticle, and wherein said axis of said optical body is parallel to and offset from said axis of said reticle, said motor means serving to rotate said axis of said optical body around said axis of said reticle whereby said axis of said optical member describes a circular path over the surface of said reticle.

4. Guidance apparatus for guiding a body along a straight path, comprising a transmitter for mounting in a fixed position and a receiver for fixing to said body,
   said transmitter comprising a source of radiation in the wavelength range including visible and infra-red radiation, a reticle having an axis and divided into adjacent bands of different opacity, each of said bands varying in width along its length, said reticle being so located in relation to said source as to receive uniform illumination therefrom, an optical member having an axis and located at a greater distance from said source than said reticle and in a position so as to collect radiation passing through said reticle from said source, said optical member being operative to emit said collected radiation in the form of a beam issuing from said transmitter to define said straight path, and motor means for causing effective rotation of one of said axes around the other of said axes to thereby modulate said beam,
   said receiver including a pair of radiation detectors responsive to frequency variations in said beam, and an electrical circuit connected to said detectors and operative to analyse variations in the frequency of radiation sensed by said radiation detectors to provide control signals for guiding said body along said straight path.

5. Guidance apparatus according to claim 4 wherein the said radiation detectors each have coplanar radiation receiving areas separated by a short distance and each have respective outputs, said receiver including a pair of discriminators each having an input connected respectively to one of said detector outputs and an output, adding and subtracting means having input means connected to said discriminator outputs and output means to produce a first signal resulting from addition of signals appearing at said discriminator outputs and a second signal resulting from subtraction of signals appearing at said discriminator outputs, a pair of co-ordinate detectors and a 90° phase shift means, each of said coordinate detectors containing multiplication means, means connecting said coordinate detectors to said addition and subtraction means and to said phase shift means, whereby said first and said second signals are fed to one of said coordinate detectors and said first signal is also fed to the other of said coordinate detectors while said second signal is also fed to said 90° phase shift means and thence to the other of said coordinate detectors, said coordinate detectors being provided with control signal outputs where the said control signals are indicative of a deviation of a point located mid-way between the said coplanar areas from the center of said beam.

6. Guidance apparatus for guiding a body along a straight path, comprising a transmitter for mounting in a fixed position and a receiver for fixing to said body, said transmitter comprising a source of radiation in the wavelength range including visible and infra-red radiation, a reticle having an axis and divided into bands of at least three different opacities, each of the said bands varying in width along its length, said reticle being so located in relation to said source as to receive uniform illumination therefrom, an optical member having an axis and located at a greater distance from said source than said reticle and in a position such as to collect radiation passing through said reticle from said source, said optical member being operative to emit said collected radiation in the form of a beam issuing from said transmitter to define said straight path, and motor means for causing effective rotation of one of said axes around the other of said axes to thereby impart modulation to said beam, said receiver including a radiation detector responsive to frequency variations in said beam, and an electrical circuit operative to analyse variations in frequency of radiation sensed by said radiation detector to provide control signals for guiding said body along said straight path.

7. Guidance apparatus according to claim 6 wherein said receiver includes:

an amplitude demodulator and means connecting said demodulator to said radiation detector, a frequency demodulator connected in parallel with said amplitude demodulator;

first and second phase sensitive rectifiers, said first rectifier being connected to receive a signal from said frequency demodulator and to be switched by said amplitude demodulator, and said second rectifier being connected so as to be switched by a signal from said frequency demodulator;

a quadrature generator;

means connecting said generator whereby a signal from said amplitude demodulator is fed to said generator and is subsequently fed to said second phase sensitive rectifier, whereby said rectifiers produce said control signals indicative of the deviation of said detector from centre of said beam.

8. A transmitter for guiding a body along a straight path comprising a source of radiation in the wavelength range including visible and infra-red radiation, a reticle having an axis and divided into adjacent bands of different opacity, each of the said bands varying in width along its length, said reticle being so located in relation to said source as to receive uniform illumination therefrom, an optical member having an axis and located at a greater distance from said source than said reticle and in a position so as to collect radiation passing through said reticle from said source, said optical member being operative to emit said collected radiation in the form of a beam issuing from said transmitter, and means to rotate one of said axes around the other of said axes whereby to impart modulation to said beam.

References Cited

UNITED STATES PATENTS

| | | | |
|---|---|---|---|
| 2,916,836 | 12/1959 | Stewart et al. | 37—143 |
| 2,965,762 | 12/1960 | Turck | 250—203 |
| 2,989,640 | 6/1961 | Turck | 250—203 |
| 2,997,699 | 8/1961 | Lovell | 250—203 X |
| 3,012,469 | 12/1961 | Clayborne | 88—14 |
| 3,141,418 | 7/1964 | Clayborne et al. | 88—14 |
| 3,220,298 | 11/1965 | Powell et al. | 88—14 |
| 3,226,057 | 12/1965 | Wilson | 250—203 X |

ARCHIE R. BORCHELT, *Primary Examiner.*

RALPH G. NILSON, *Examiner.*

M. A. LEAVITT, *Assistant Examiner.*